Inventors:-
Larry C. Frazier,
Emerson C. Bryant.

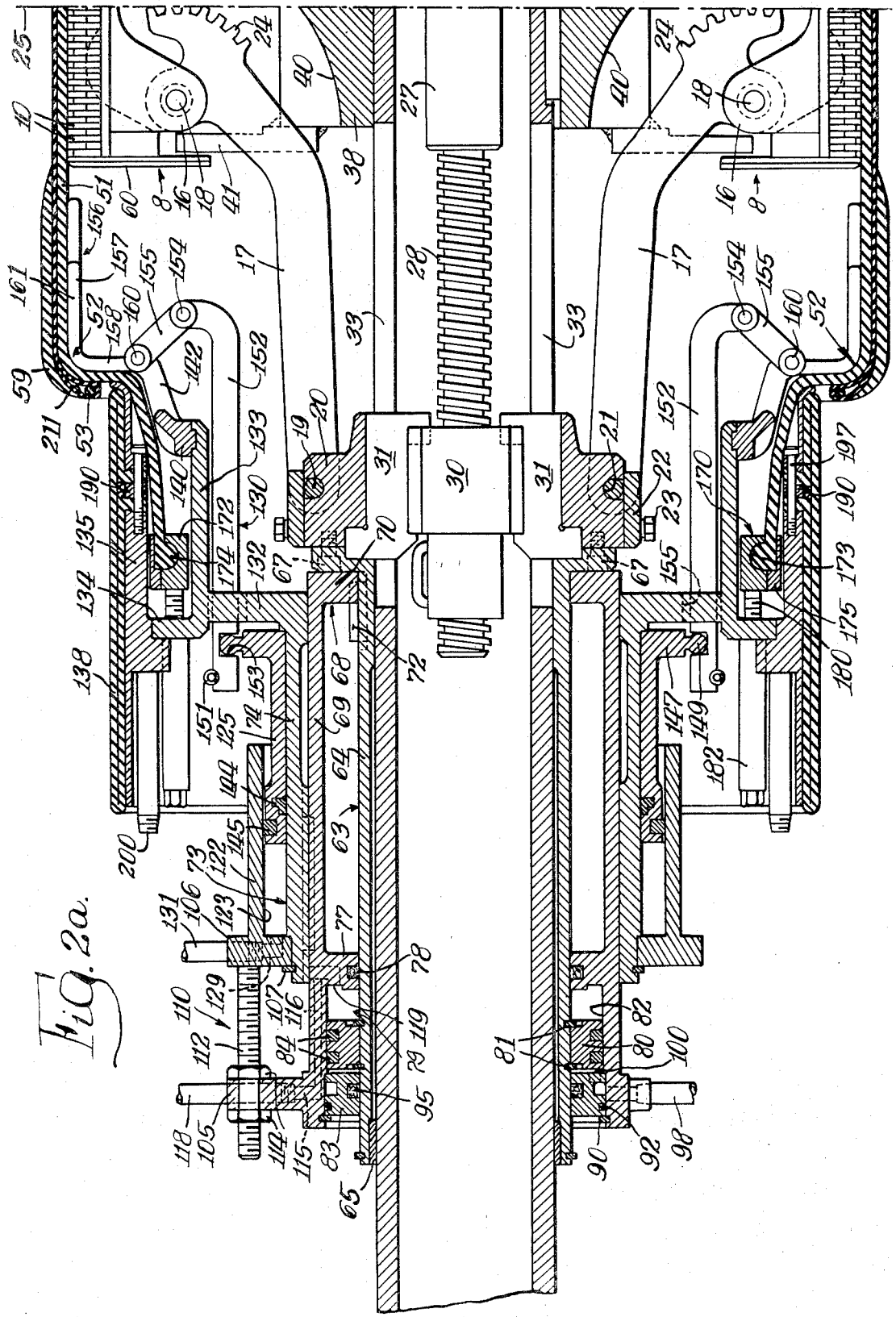

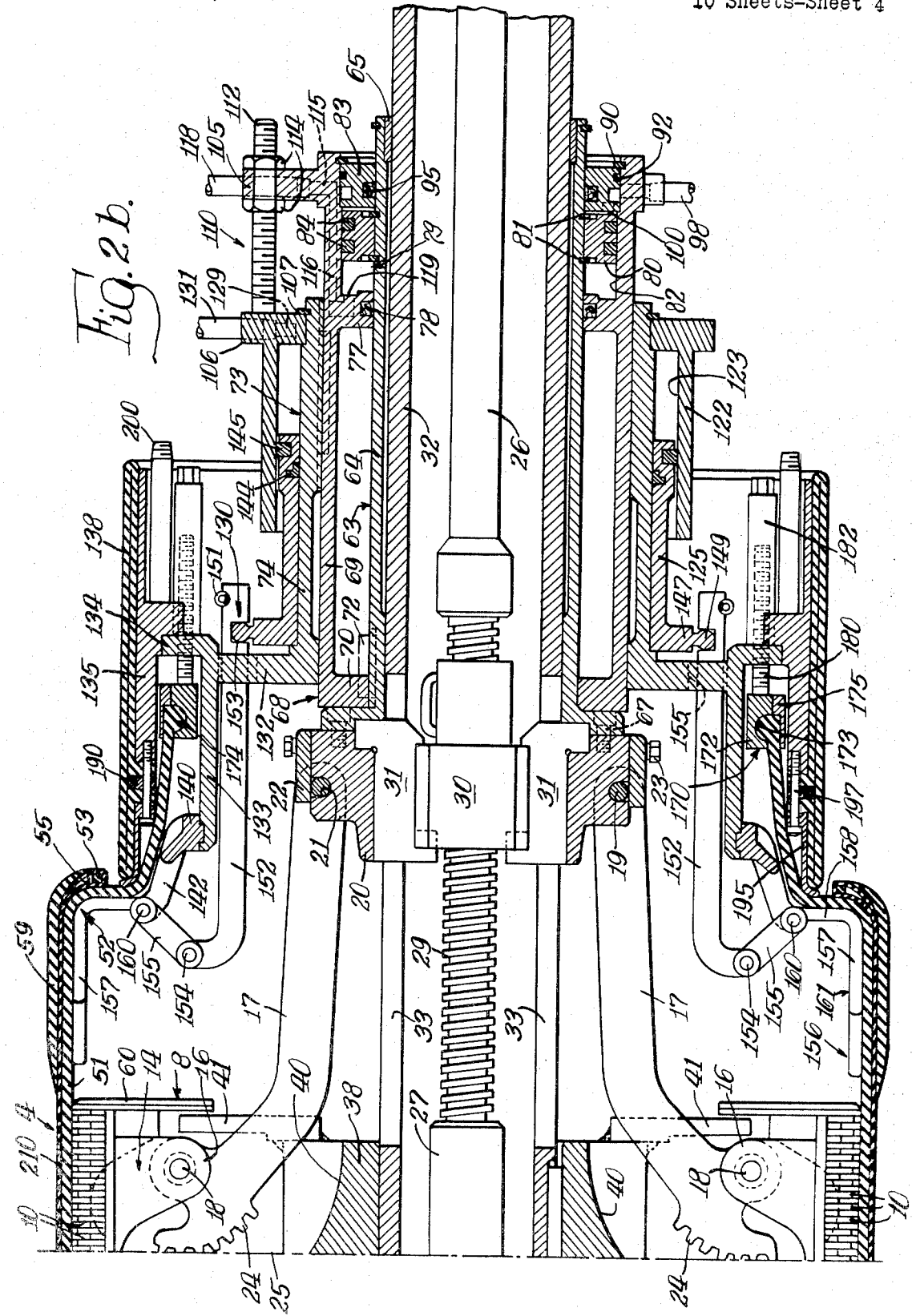

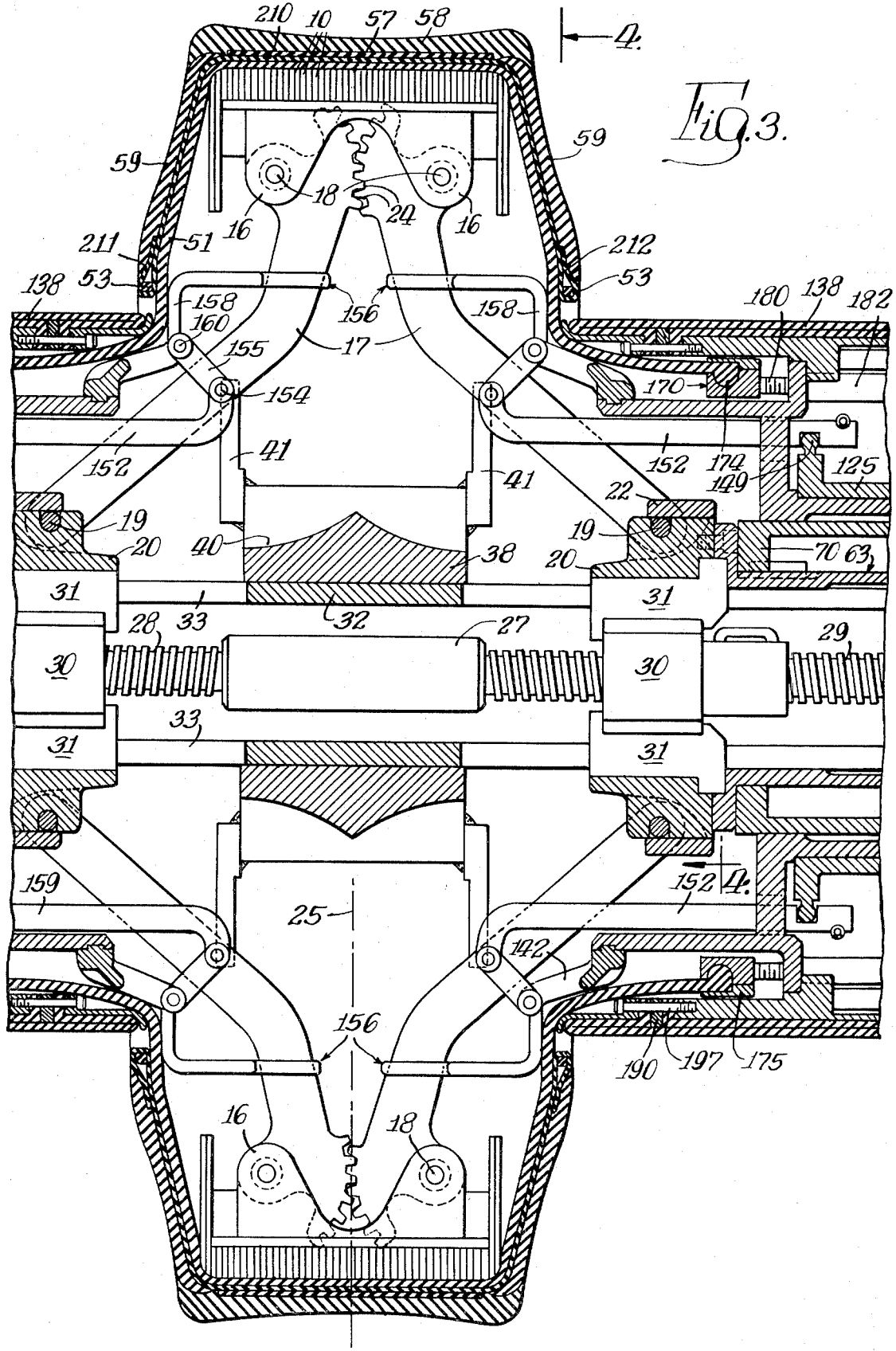

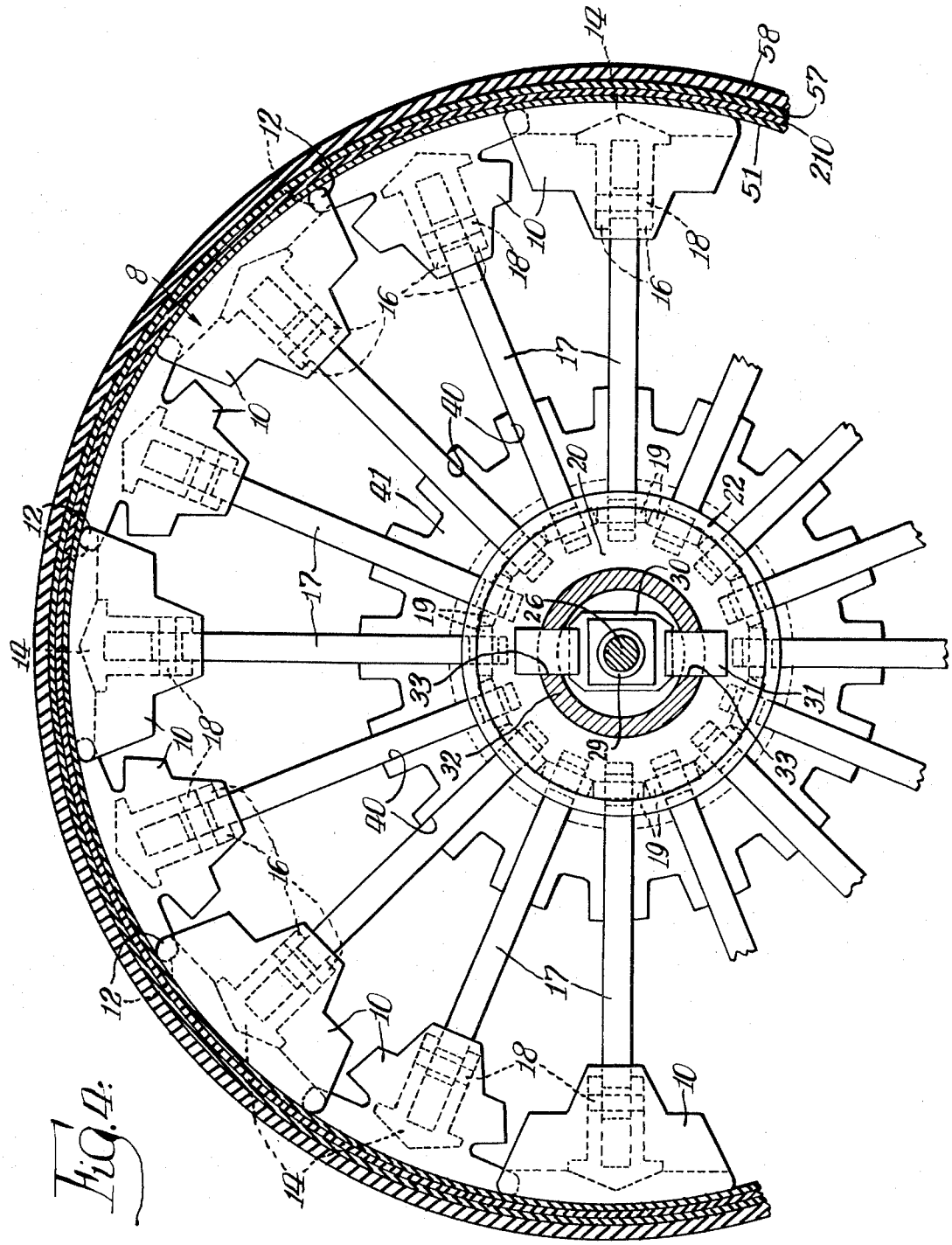

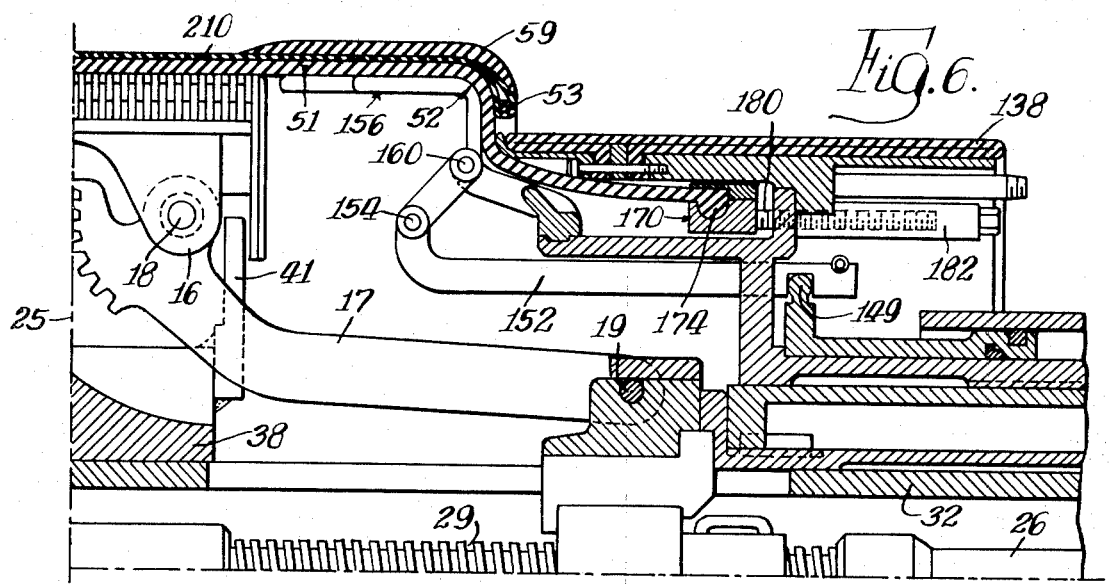
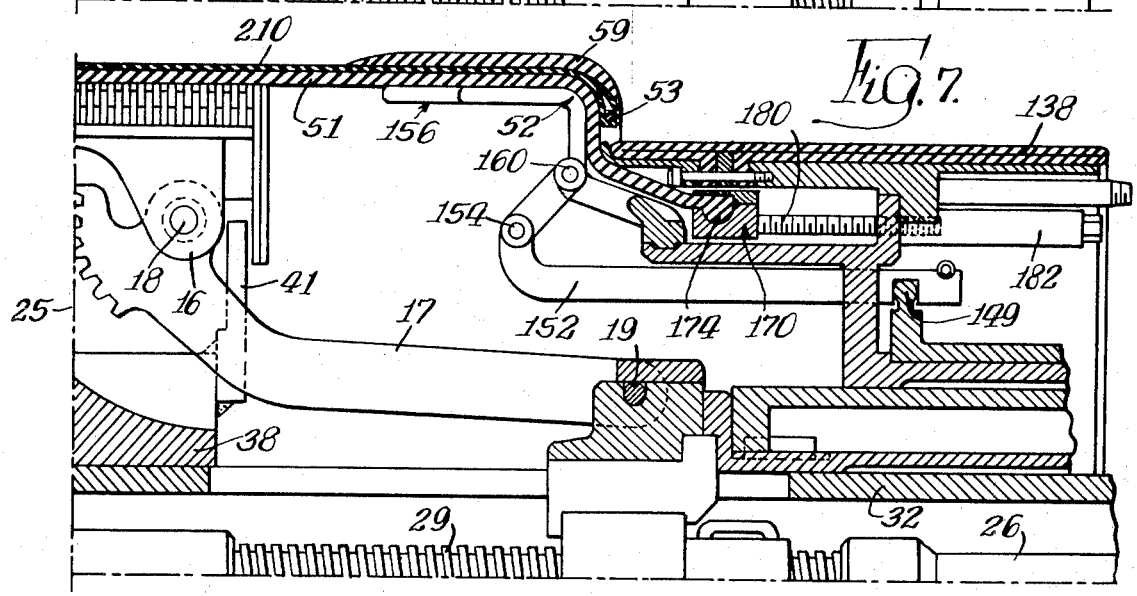
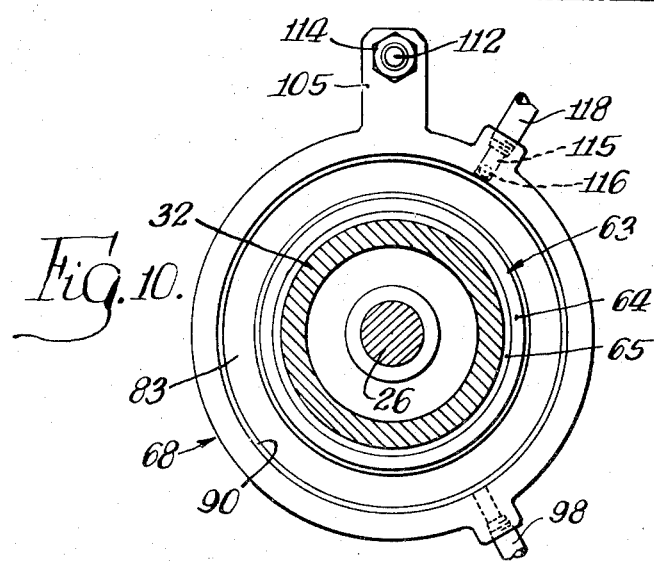

Aug. 15, 1972  L. C. FRAZIER ET AL  3,684,621
TIRE BUILDING DRUM
Filed June 18, 1970  10 Sheets-Sheet 9
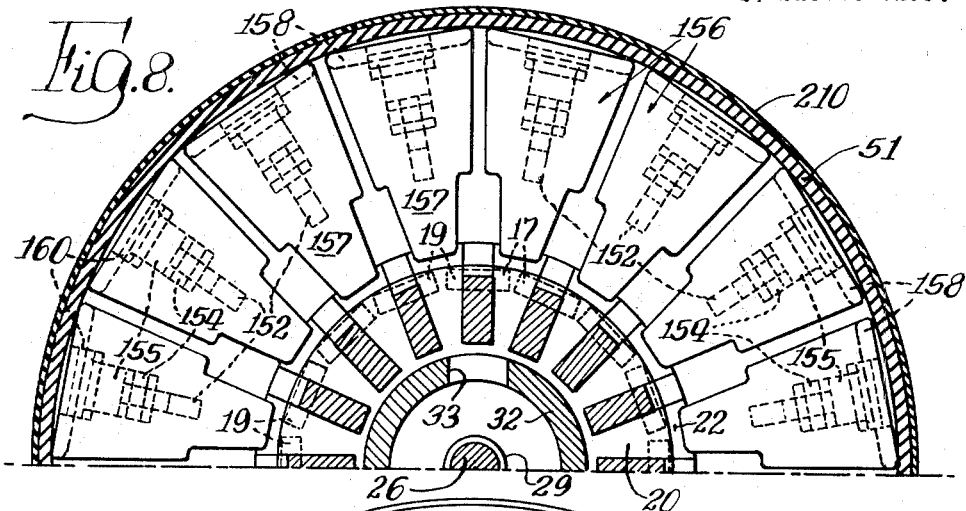
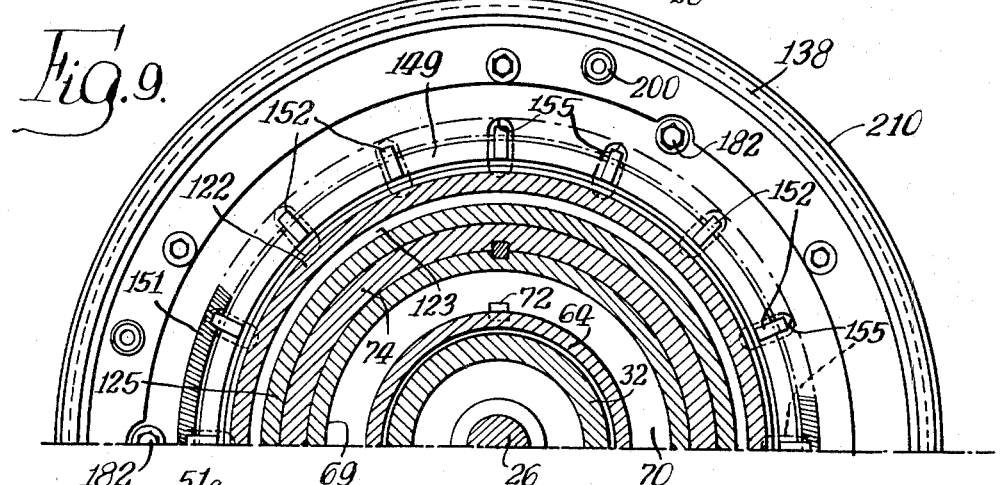
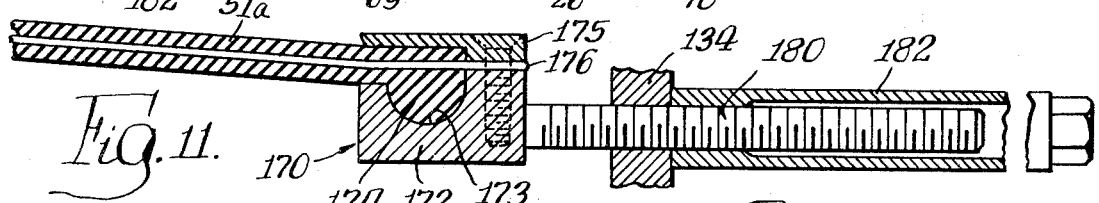
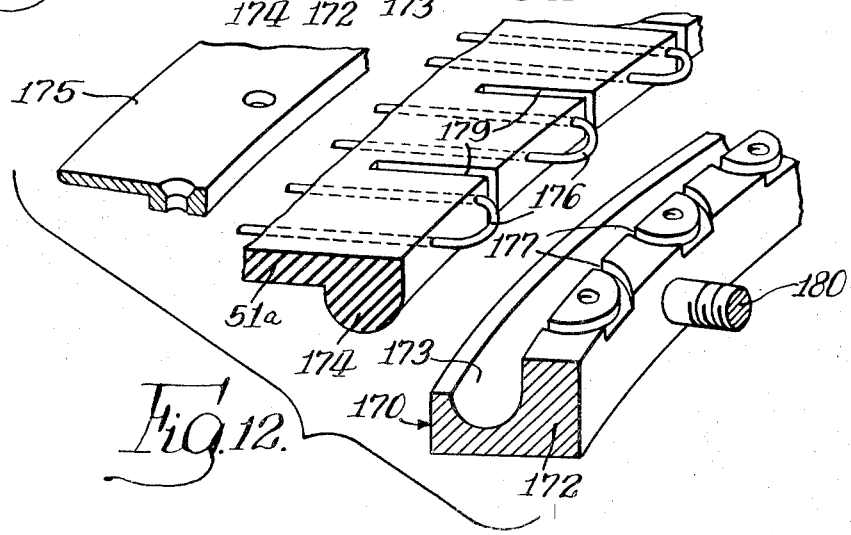

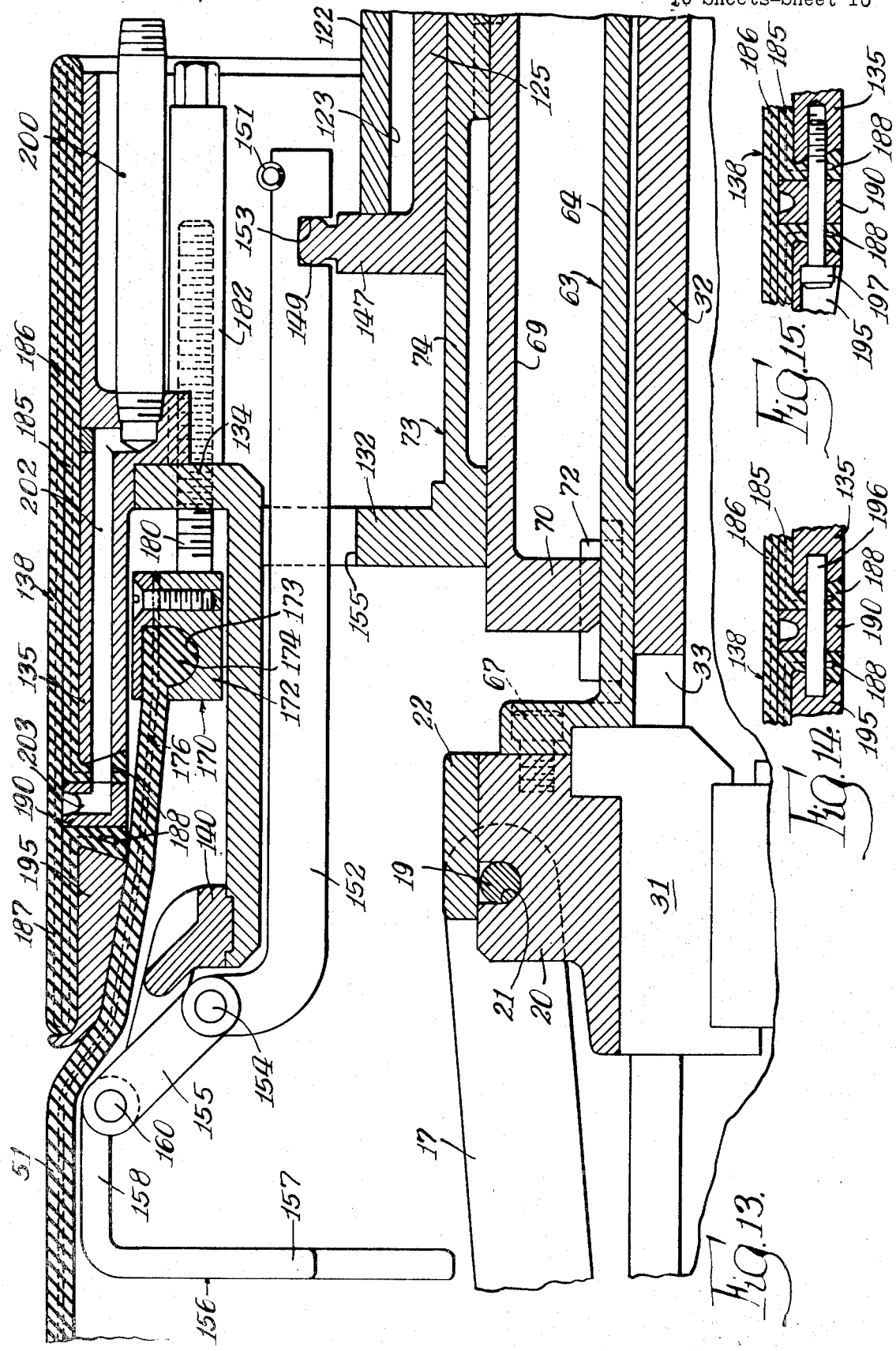

3,684,621
TIRE BUILDING DRUM

Larry C. Frazier, Sun City, Ariz., and Emerson C. Bryant, South Bend, Ind., assignors to National-Standard Company, Niles, Mich.
Filed June 18, 1970, Ser. No. 47,522
Int. Cl. B29h 17/16, 17/22, 17/26
U.S. Cl. 156—401
19 Claims

ABSTRACT OF THE DISCLOSURE

A tire building apparatus having an intermediate expandable drum embodying axially movable intermediate drum expanding and contracting means to dispose the intermediate expandable drum in positions defining substantially cylindrical supporting surfaces of different radii, end drum and tire bead shoulder supporting means movable axially with movable drum expanding and contracting means, end drum carrier means movable axially with and relative to the end drum and bead shoulder supporting means, end drums supported by said end drum carrier means at opposite ends of the intermediate drum, and tire bead shoulder carrier means movable axially of and relative to the end drum carrier means in which the tire bead shoulder carrier means is provided with tire bead shoulder forming means mounted on the end drum carrier means adapted to be positioned to form tire bead shoulders opposite the ends of the intermediate expandable drum in predetermined axial positions of the end drum carrier means and the tire bead shoulder carrier means. The incorporation in an assembly as last noted in which end drum adjusting means associated with the end drum carrier means provides for disposing the end drums within a predetermined range of axially spaced apart relationships with respect to each other to dispose the tire bead shoulder forming means within a predetermined infinite range of spaced apart relationships with respect to each other. A tire building apparatus having the aforementioned intermediate expandable drum and end drums at opposite ends of the intermediate drum which in an initial or starting position define a substantially cylindrical supporting surface with the intermediate drum assembly for supporting tire carcass material in the form of a cylinder, in which the end drum carrier means are movable axially toward each other to move the end drums and the end portions of the tire carcass material on the end drums axially toward each other to compensate or allow for the formation of tire bead shoulders, against which tire beads are positioned, by the radial outward movement of the tire carcass material on the intermediate expandable drum by the tire bead shoulder forming means without substantially distorting the tire carcass material around the intermediate drum assembly and the end drums, and in which opposite end portions of the tire carcass material are layed over the tire beads to encase the tire beads.

The aforedescribed tire building apparatus for building a radial tire in which the tire beads are encased in tire carcass material having substantially inextensible reinforcing cords extending axially from bead to bead, and embodying control means between the end drum and bead shoulder supporting means and the drum carrier means so that the encased and anchored tire beads maintain the reinforcing cords under tension from bead to bead providing a constant bead to bead dimension in displacement of tire carcass material into substantially torous configuration approximating that of a completed tire.

An end drum assembly for a tire building apparatus including an end drum member for supporting an inflatable ply turn-up bag means in which the bag means has opposed but spaced apart tapered anchor ends adapted to be retained on the end drum in a manner for preventing outward movement of the anchor ends of the bag means.

BACKGROUND OF THE INVENTION

It is known prior to the present invention to provide tire building apparatus comprising an intermediate drum and end drums which in starting or initial positions thereof for building a tire define a substantially cylindrical surface for supporting tire carcass material thereon. The intermediate drum may, for example, be of a construction employing a plurality of circumferentially arranged platforms or deck segments each of which include a plurality of supporting members or blades extending in a direction circumferentially of the drum, and which are in end to end interleaved relation between adjacent deck segments to that upon the outward radial displacement of the deck segments the other surfaces of the supporting members or blades define substantially cylindrical supporting surfaces of different diameters. Thus, after laying of tire carcass material around the intermediate drum and end drums in their initial positions, the intermediate drum may be expanded to form bead shoulders at the ends thereof adjacent the end drums. The tire beads may be applied to the shoulders and the carcass material on the end drums turned up or layed in known manner over the tire beads to encase the latter, or, if desired, as is also known, the tire beads may be pre-positioned and the intermediate drum assembly then expanded to engage the formed bead shoulders with the pre-positioned tire beads. Thereafter, the intermediate drum may be further radially expanded to form the tire carcass material into substantially torous configuration approximating that of a completed tire for the application, for example, of breaker and tread components to the crown portion of the tire carcass. Alternately, as is also known, breaker and tread components may be supported radially outwardly of the intermediate drum assembly so that upon radial expansion of the intermediate drum assembly the tire carcass material therearound is expanded and pressed against breaker and tread components so supported. The supporting members or blades of the deck segments in the positions last noted provide a firm surface supporting the tire carcass material enabling components such as breakers and tread components to be well stitched to the tire carcass.

The known tire building machines of the character noted have utility for building a tire carcass with the tire beads of a given predetermined diameter in but one fixed axially spaced apart relation with respect to each other, and are not adaptable to building tires for the given bead diameter with the tire bead shoulders being adapted to be formed in a range of infinite axially spaced apart relationships with respect to each other.

THE INVENTION

The invention comprehends a tire building apparatus having an intermediate drum and end drums of the class noted which embody novel means for providing for formation of tire bead shoulders within a predetermined range of infinite axially spaced apart relationships for tire beads of a given predetermined diameter.

An important feature of the invention is to provide for the axial inward movement of an end portion of the tire carcass while the tire bead shoulder is being formed by radial outward movement of the tire carcass material to form a tire bead shoulder at the end of the intermediate drum.

Another important feature of the apparatus of the invention as it pertains to the building of radial tires in which the tire carcass material has substantially inextensible reinforcing cords which extend axially from bead to bead in the completed tire, is to provide, after embedding or anchoring of the tire bead in opposite end portions of tire carcass material, control means operable so that the encased tire beads maintain the reinforcing cords of the tire carcass material under tension in forming the tire carcass material into substantially torous configuration so as to maintain constant the bead to bead dimension in forming the tire carcass material into torous configuration.

Another important feature of the invention resides in the incorporation of sleeve means encasing the intermediate expandable drum and anchored at its opposite ends in the end drum carrier means together with provision of means for rendering the sleeve means taut, and adjusting the ends thereof in the end drum carrier means to accommodate formation of the tire bead shoulders within the predetermined infinite range of axially spaced apart relationships of the tire beads.

Another important feature of the invention resides in the construction of an end drum assembly embodying an inflatable ply turn-up bag means in which opposite ends of the bag means are secured to a drum member in a manner preventing outward movement of the opposite ends of the bag means from the end drum member.

DESCRIPTION OF THE DRAWINGS

FIGS. 2a and 2b joined in end to end relation on the dot-dash center line show a longitudinal sectional view of the tire building apparatus of FIGS. 1a and 1b with the parts in position forming tire bead shoulders in the tire carcass material at opposite ends of an intermediate expandable drum of the apparatus;

FIG. 3 is a longitudinal section of the right hand and central portion of the tire building apparatus of FIG. 1b and 1b with the parts in position for forming tire carcass material into substantially torous configuration approximating that of the completed tire;

FIG. 4 is a view taken substantially along the line 4—4 on FIG. 3 looking in the direction indicated by the arrows;

FIG. 6 is a view of the upper right hand portion of the apparatus shown in FIG. 1b showing the position of the parts providing for minimum spacing apart of the tire beads for a tire carcass;

FIG. 7 is a view similar to FIG. 6 but showing the position of the parts providing maximum spacing apart of the tire beads for a tire carcass;

FIG. 8 is a detail vertical sectional view taken along the line 8—8 of FIG. 1b looking in the direction indicated by the arrows;

FIG. 9 is a detail vertical sectional view taken along the line 9—9 of FIG. 1b looking in the direction indicated by the arrows;

FIG. 10 is a detail vertical sectional view taken along the line 10—10 of FIG. 1b looking in a direction indicated by the arrows;

FIG. 11 is a detail sectional view showing the manner in which one end of sleeve means for the tire building apparatus is anchored in an end drum of the apparatus;

FIG. 12 is a partial exploded perspective view of an anchored end of the intermediate inextensible elastic sleeve of the tire building apparatus;

FIG. 13 is an enlarged sectional view of the right hand end portion of the end drum of FIG. 1b;

FIG. 14 is a partial detail sectional view showing the manner in which the end of an inflatable ply turn-up bag means of FIG. 13 for an end drum of the tire building apparatus is assembled; and FIG. 15 is a partial detail sectional view of the end of the inflatable bag of FIG. 14 showing the manner in which an inflatable ply turn-up bag is secured to an end drum.

DESCRIPTION OF A PREFERRED EMBODIMENT OF THE INVENTION

Figure 1A:
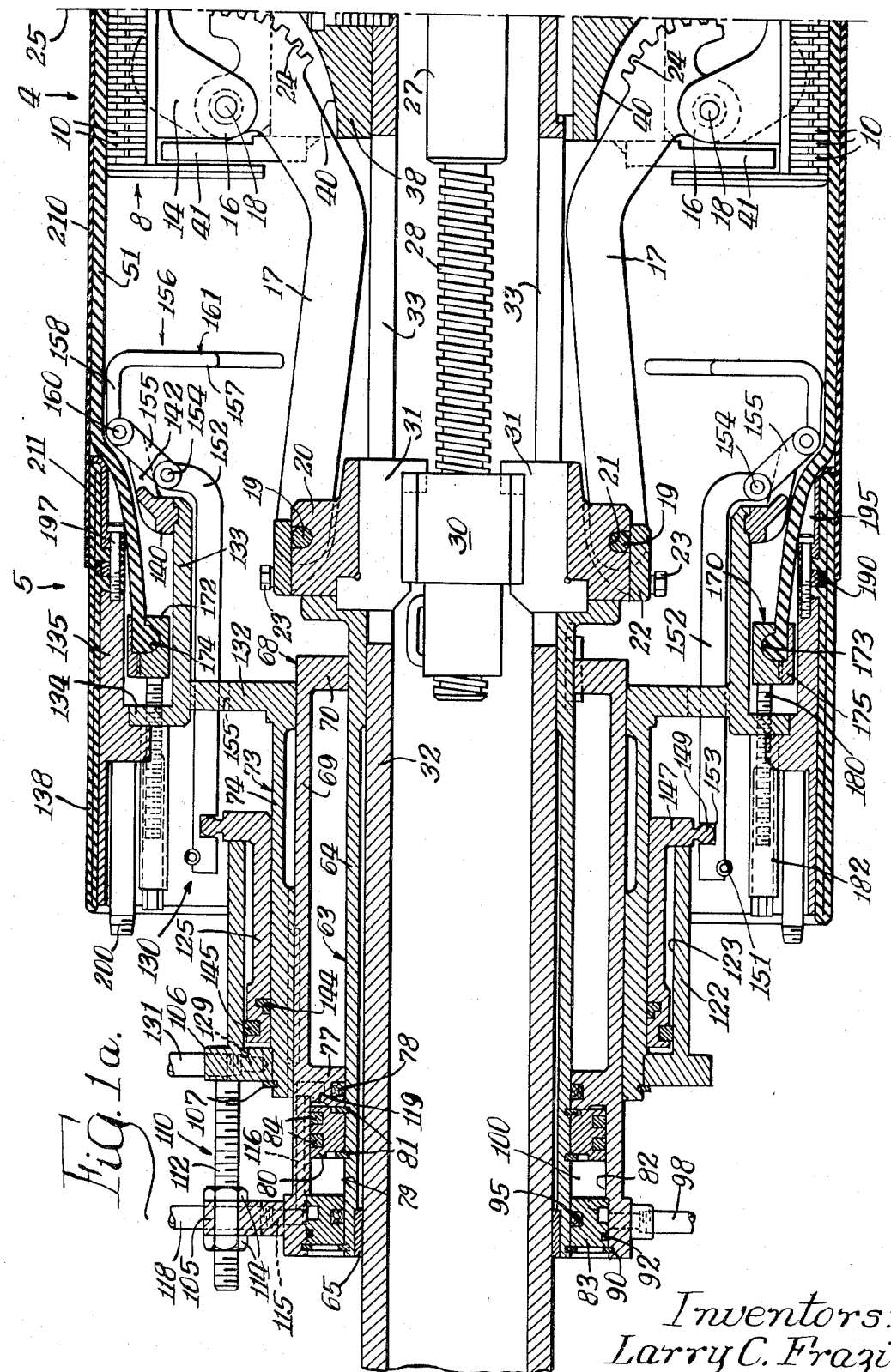
FIGS. 1a and 1b joined in end to end relation on the dot-dash center line show a longitudinal sectional view of a tire building apparatus according to the present invention with the parts in position for supporting tire carcass material in cylindrical or tubular form thereon.
Figure 1B:
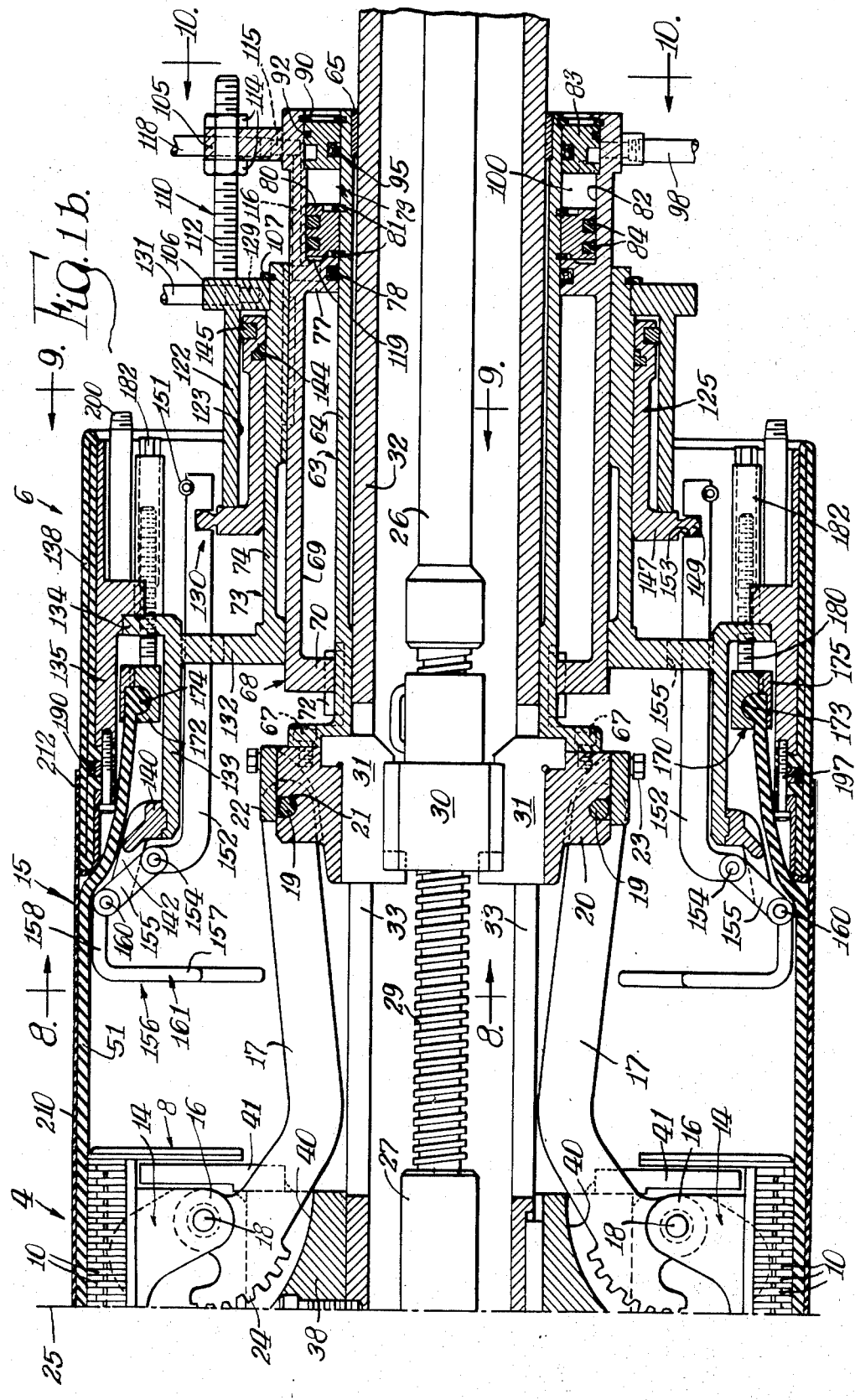

Referring now to FIG. 1a and FIG. 1b of the drawings, the tire building apparatus there shown comprises an intermediate expandable drum assembly 4 and end drum assemblies 5 and 6.

The intermediate expandable drum assembly 4 as best seen in FIGS. 1a, 1b and 4 is of a construction shown and described in the copending application of Emerson C. Bryant, one of the present joint inventors, filed Jan. 20, 1970, Ser. No. 4,285. The drum assembly 4 as disclosed in the foregoing application comprises a plurality of circumferentially arranged platforms or deck segments 8. Each deck segment may typically include a plurality of supporting members or blades 10 extending circumferentially of the drum 4 in spaced apart side by side relation and which are in end to end interleaved relation between adjacent drum sections 8. In the fully expanded position of the expandable intermediate drum assembly 4 as best seen in FIGS. 3 and 4, the adjacent end portions 12 of adjacent blades preferably remain interleaved. Each deck segment 8 is formed with a bifurcated bracket 14 having radially inwardly extending opposed arm portions 16 between which the inner ends of pusher arms 17 are pivotally mounted as at 18. The pusher arms lie in planes extending axially of the intermediate drum assembly 4 and at their outer ends are pivotally mounted as at 19 in axially spaced apart pusher means, such as pusher rings 20.

As shown the pusher rings 20 are formed with transversely extending substantially annular sockets 21 receiving the pivot pins 19, which pivot pins are retained in the sockets by retaining member 22 secured to the pusher ring 20 by bolts 23. The pusher arms 17 adjacent their inner ends are provided with identical meshing gear teeth 24 of the transverse center line 25 of the intermediate drum assembly 4 perpendicular to the axis of the pusher ring 20.

In order to provide for the axial inward and outward movement of the pusher rings 20 with respect to each other, there is provided a hollow outer shaft 32 within which inner shaft means 26 is arranged. Typically, the inner shaft means 26 is formed with left and right hand threaded shaft sections 28 and 29, respectively, joined by a collar 27 at their opposed inner ends for keying the two shafts together for conjoint rotation. Ball nuts 30 have threaded engagement with the threaded portion of each of the shafts 28 and 29 each of which carry ball nut adapters 31 which extend through axially extending slots 33 disposed in diametrically opposed relation in the hollow shaft member 32, with one such slot being provided for each of the nut adapters 31. The ball nut adapters 31 have the above described pusher rings 20 secured thereto. Mounted centrally of the hollow shaft 32 is a guide block means 38 comprising a hub and end flange member 41 at opposite ends of the hub of the guide block means. The guide block means 38 is provided with slots 40 which serve to guide or prevent circumferential movement of the adjacent outer portions of the pusher arms in operation of the apparatus.

As before indicated, FIGS. 1a and 1b show the position of the parts in initial or starting position for the construction of a tire carcass. In this position of the parts, the inner screw means 26 has been suitably rotated by means not shown to dispose the pusher rings to their axially outermost position with respect to each other, and in which positions the intermediate expandable drum assembly 4 together with the end drums 5 and 6 define a substantially cylindrical surface for supporting tire carcass material as indicated at 15 in the form of a cylindrical tube around sleeve means 51 extending between the end drums and encasing the intermediate expandable drum assembly 4. After placement of the tire carcass material as noted in connection with FIGS. 1a and 1b, the inner shaft means 26 is rotated to effect conjoint axial inward movement of the pusher rings 20 toward each other and at the same rate and which through the meshing engagement of the gear teeth 24 radially expand the intermediate drum assembly to a position at which bead shoulders are to be formed as shown in FIGS. 2a and 2b, and at which the supporting members or blades have moved circumferentially relative to each other to provide a cylindrical supporting surface for the intermediate drum assembly of larger diameter than that shown in FIGS. 1a and 1b which through components to be described provide bead shoulders, as indicated at 52, for the application of tire beads 53 to the tire carcass material. Also, if desired, tire side wall components (not shown) may be applied to the end drum assemblies 5 and 6. After forming the ply turn-ups 55 for the beads, anchoring the beads in opposite end portions of the tire carcass material sometimes referred to in the art as bead locks, as shown in the positions of the parts in FIGS. 2a and 2b, the inner shaft means 26 is further rotated to effect the further inward axial conjoint movement of the pusher rings 20 toward each other, and which through the meshing gear teeth 24 provide for disposal of the intermediate drum assembly to the position shown in FIG. 3. In this position of the parts, the tire carcass material has been formed into substantially torous configuration approximating that of a completed tire. It will be noted that in movement of the parts from the position shown in FIGS. 1a and 1b to the position shown in FIGS. 2a and 2b, that the inner end portions of the pusher arms 17 are guided in the slots 40 of the guide block means 38 and the end guide members 41 and in the advancement of the parts from the position shown in FIGS. 2a and 2b to the position shown in FIG. 3, the slots 40 and the end guide members 41 continue to guide the pusher arms 17.

It will be observed that the slots 40 of the guide block means 38 and the end members 41 prevent substantial circumferential movement of the guide arms 17 and add rigidity to the drum construction in a circumferential direction. The meshing of the gear teeth 24 in the position of the parts as shown in FIG. 3 rigidly and accurately dispose the deck segments 8 with respect to each other so that the supporting members define an accurate substantially cylindrical supporting surface symmetrically around the longitudinal axis of the drum for the tire carcass material to enable the application of a breaker 57 and a tread cap 58 as shown in FIG. 3 as, for instance, by conventional stitching wheels or otherwise as aforedescribed. The side walls 59 as aforenoted may be layed upon the end drums 5 and 6 for application to the sides of the tire carcass material or may be applied after expansion of the intermediate drum assembly to the position shown in FIG. 3. The foregoing construction provides a rigid intermediate drum assembly for taking both radial and axial thrust in stitching components of a tire to a tire carcass.

In the specific form of intermediate expandable drum 4 it should be noted that the bear teeth 24 are constantly in mesh and as the deck segments are forced radially outwardly on the axis 25 perpendicular to the axis of the pusher means 20 and equidistant therebetween causing the deck segments to remain substantially level or parallel to the axis of the intermediate expandable drum 4. The gear teeth 24 as noted also maintain the deck segments in a level position resisting unequal roller pressures and also side pressures such as are present in the application of the breaker and tread cap or side wall components as may occur in conventional stitching operations. Also, in the intermediates drum assembly 4 shown in the drawings, the guide slots 40 in the guide block means 38 and arms 41 serve as torsion driving members for the pusher arms 17 and through them for the deck segments when it is desired to effect rotation of the intermediate assembly as for example in the stitching of the breaker or tread caps of the tire carcass.

Figure 5:
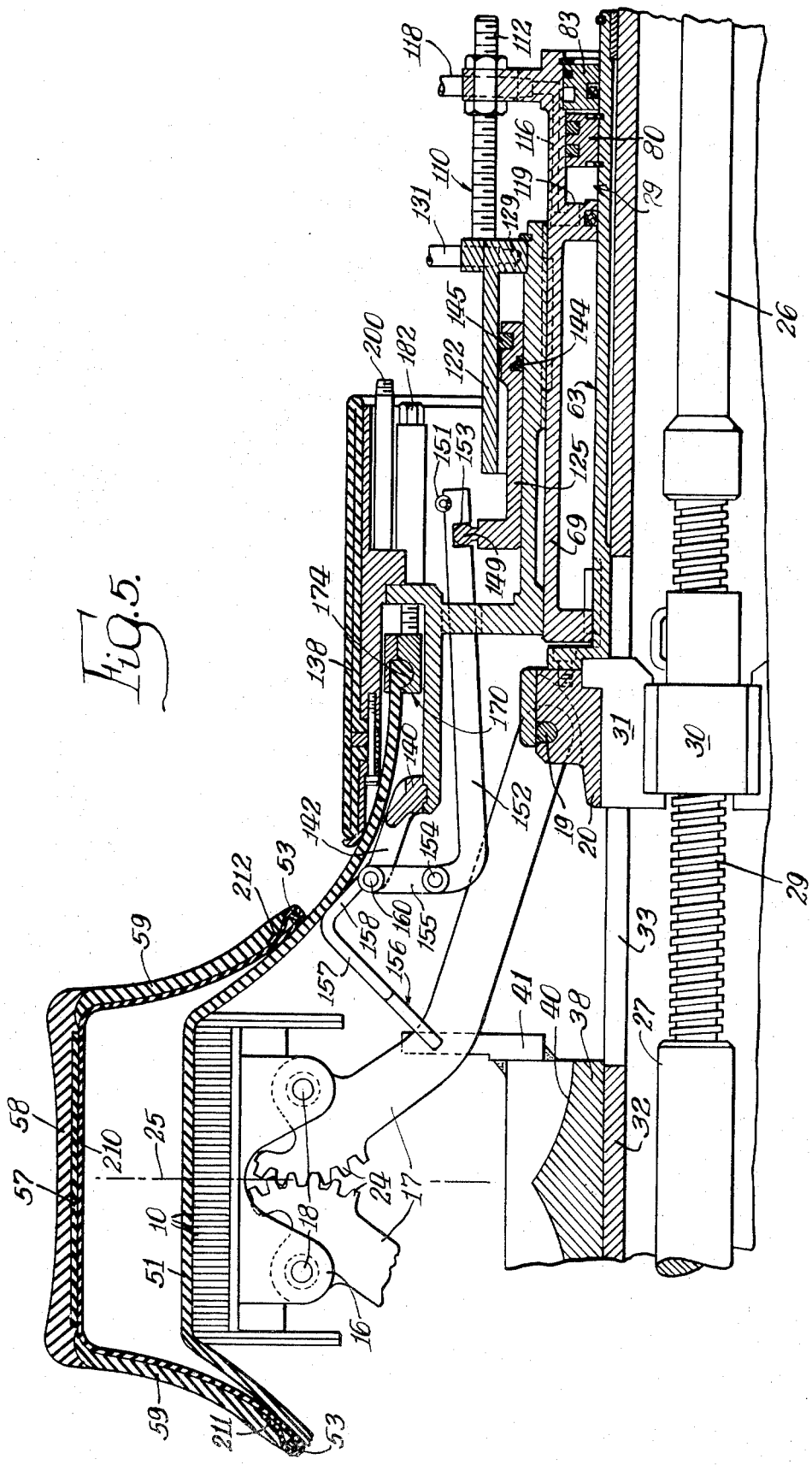
FIG. 5 is a sectional view of the upper right hand and central portion of the tire building apparatus of FIG. 1b showing the position of the parts in collapsing the drum to remove a completed assembly of components of a tire.

FIG. 5 shows the intermediate drum assembly 4 in partially collapsed position after completion of the assembly of components for a tire with the geometry being such that the intermediate drum 4 collapses out of the assembled components of the tire carcass material to enable removal or the completed assembly of tire components from the drum upon completion of retraction of the parts to the position shown in FIGS. 1a and 1b.

The intermediate expandable drum 4 may also be provided with readily attachable and detachable end supporting members or blades 60 at the opposite ends of the drum to provide a desired deck width to provide the tire carcass with a predetermined tread width, disclosed for example, in the copending application of Larry C. Frazier, one of the present joint inventors, Ser. No. 736,363, filed June 12, 1968.

The present invention comprehends the incorporation in a tire building apparatus having an intermediate expandable drum, such as the typical construction aforedescribed, or of other suitable construction to provide for the expansion of an intermediate portion of tire carcass material, and for formation of tire bead shoulders axially outwardly of opposite ends of the intermediate drum, of an arrangement of parts for forming tire bead shoulders lying within a predetermined infinite range of spaced apart relationships with respect to each other for a given predetermined tire bead diameter.

To the foregoing end and as shown in FIGS. 1a, 1b, 2a, 2b, 3, 5, 6 and 7 end drum and tire bead shoulder supporting means 63 defined by sleeves 64 are connected one each at one end of the outer end of each of the pusher rings 20, as by bolts 67, to extend axially outwardly therefrom and coaxially of hollow shaft 32. The outer ends of sleeves 64 are supported by bearings 65 on the hollow shafts 32. The sleeves 64 thus move axially inwardly and outwardly with the axial inward and outward movement of the pusher rings 20 as above described. End drum carrier means 68 extend co-axially of each sleeve 64 and comprise a first carrier member 69 in the form of a cylinder having an annular flange at the inner end at 70 keyed, as at 72, to the sleeve 64 for axial movement with and relative to sleeve 64. The end drum carrier means 68 further each comprise a second carrier member 73 having a tubular cylindrical portion 74 disposed concentrically about first carrier member 69 for a movement axially with and adjustable axially relative to the first carrier member 69 in a manner to be described.

Each first carrier member 69 axially inwardly of its outer end is provided with a radially inwardly extending annular portion 77 with their being a seal 78 at the inner surface thereof engaging with the outer surface of sleeve 64. Since the components at opposite ends of the expandable intermediate drum 4 are of the same construction the following description in the main will be limited to but one arrangement of such components but with the reference numeral being applied to like parts at opposite ends of the intermediate drum. Control means generally indicated at 79 comprises a piston 80 retained by retainer rings 81 to sleeve 64. The control means 79 further comprises a cylinder 82 in which the piston 80 is disposed between the inner cylindrical surface of the outer end of cylinder 69, and the outer cylindrical surface adjacent the outer end of sleeve 64 and between the radially inwardly extending flange 77 and annular ring 83 suitably secured on the outer end of the first carrier member 69. Piston rings 84 for the piston 80 engage with inner surface of the portion of the first carrier member 69 defining in part the cylinder for the piston. The annular ring 83 is secured at the outer end of the first carrier member 69 by retaining ring 90, and carries an O-ring 92 in its outer periphery to form an air seal with the inner cylindrical surface of the outer end portion of the first carrier member 69. The ring 83 is free to slide on the sleeve 64 and is provided at its inner periphery with a packing 95 to form an air seal.

The control means 80 also comprises an air pressure hose 98 having suitable connection through the first carrier member 69 for admitting air under pressure into the cylinder 82 opposite the outer end 100 of piston 80 to maintain the first carrier member 69 in the position shown in FIGS. 1a and 1b.

The first carrier member 69 at its outer end includes an annular flange 105, and the second carrier member 73 at its outer end, inwardly of the outer end of flange 105 of the first carrier member, has mounted thereon an annular flange 106 retained in position by a retainer ring 107. End drum adjusting means 110 extends between the flange 105 of the first carrier member 69 and annular flange 106 of the second carrier member 73, and comprises a threaded stud 112 fastened at its inner end to flange 106 and projecting axially outwardly through flange 105. A pair of adjustment nuts 114 at opposite sides of flange 105 have threaded engagement with stud 105 to dispose the stud 112 in predetermined position to locate the second carrier member 73 in predetermined axial position with respect to the first carrier means 68.

The end flange member 105 and the outer end portion of the first carrier member 69 are suitably ported providing ports for control means 79, as at 115 and 116, respectively, for delivery of air under pressure into the cylinder 82, as from pressure hose 118 into the cylinder 82 at the inner end of piston 80 and the annular flange 77, as at 119, to provide for conjoint inward movement of the first carrier means 68 and the second carrier means 73 for purposes to be described.

The second carrier member 73 further comprises an annular sleeve 122 connected at its inner end to flange 106 to extend axially inwardly thereof, and which together with the second carrier member 73 define a cylinder 123 for receiving an annular piston 125 of tire bead shoulder carrier means indicated generally by the reference numeral 130.

Referring again to the second carrier member 73 it will be seen that it is formed at its inner end with a radially outwardly extending annular flange 132 having at the outer end thereof an axially extending cylindrical member 133 which at its outer end is formed with a radially outwardly extending annular flange 134 to which is mounted an annular end drum supporting member 135 for the end drum 6. The end drum supporting member 135 provides for the support of inflatable ply turn-up bag means 138 for the end drums 5 and 6.

At the inner end of each of the cylindrical member 133 there is provided a plurality of circumferentially spaced apart yokes 140 each having a lever arm 142 extending generally axially inwardly and radially outwardly of the inner end of the end drums.

The aforementioned tire bead shoulder carrier means 130 has the piston 125 thereof provided at its inner end with inner and outer packings or piston rings 144 and 145, respectively, for preventing air leakage around the piston 125 in the cylinder 123. The annular flange 106 of the secnod carrier member 73 is suitably ported, as shown at 129, for connection with an air pressure hose 131 for admitting air under pressure into cylinder 123 for axially inwardly advancing piston 125 for purposes to be described. The piston 125 at its inner end is formed with a radially outwardly extending flange 147 having an annular rounded outer end 149.

The tire bead shoulder carrier means 130 further comprises a plurality of circumferentially spaced apart axially extending lever arms 152, each of which inwardly of the outer end thereof is formed with a groove 153 for receiving the rounded outer end 149 of the annular end flange 147. A garter spring 151 surrounds the outer ends of the lever arms 152 to maintain the several grooves 153 in engaged relation with the rounded outer end 149 of the flange 147 of piston 125. The several lever arms 152 each project axially inwardly through openings 155 formed in the flange 132 of the second carrier member 73, and at their inner ends are each pivotally mounted as at 154 to lever 155 of a plurality of circumferentially arranged tire bead shoulder forming means indicated generally at 156. The tire bead shoulder forming means each comprise flipper means 161 defined by a right angle tire bead shoulder member having a first leg portion 157 and a second leg portion 158. Each tire bead shoulder flipper means 161 is pivotally mounted on a pivot pin 160 carried at the end of a lever 142 of a yoke 140 between the outer end of the leg 158 and the outer end of lever 155.

The aforementioned sleeve 51, as best seen in FIGS. 11 and 12, may be a simple substantially inextensible elastomeric component and may, if desired, be axially reinforced, and is anchored at its opposite ends in a ring assembly 170 at each end drum. Each ring assembly 170 comprises a first ring member 172 having an outwardly opening annular groove 173 for receiving an enlarged rounded end portion 174 at each end of elastic sleeve 51. As seen in FIG. 12 an annular closure plate 175 is secured to ring member 172 and retains the ends of the sleeve 51 in the annular groove 173 of the ring member 172 at opposite ends of the apparatus.

As best seen in FIG. 12, a sleeve 51a may, for example, have embedded therein steel wire or other material of high tensile strength extending axially back and forth and formed at opposite ends of adjacent runs with end loops 176 at opposite ends of the sleeve 51a which are adapted to be fitted in substantially semi-ciricular grooves 177 to be retained anchored therein by the closure plate 175 opposite end portions of the sleeve 51a and are preferably slitted between adjacent reinforcing wires, as at 179, allowing the sleeve to be gathered at its ends to accept a smaller inner circumference of clamp ring 175.

Referring now particularly to FIGS. 13, 14 and 15, it will be seen that a threaded stud 180 is secured to the outer end of ring 172, and projects axially outwardly through an opening in flange 134 of the second carrier member 73, and with which a threaded adjusting sleeve member or tubular nut 182 has threaded engagement for adjusting the axial position of the ring assemblies 170 for purposes of tensioning the sleeve 51, and also for disposing the ends of the sleeve 51 in adjusting the bead set, or predetermine the spacing apart of the tire bead shoulders, as will be described below.

As before described, and as best seen in FIG. 13 the end drum supporting members 135 provide for the support of the inflatable ply turn-up bag means 138. Each ply turn-up bag means 138 comprises inner and outer layers of rubber, shown at 185 and 186, respectively, and a center layer of ply fabric 187 with the cores running directly from opposed spaced apart tire bag beads 188. One tire bag bead 188 is hooked over the inner end of cylindrical member 135 after which an annular spacer ring 190 is positioned adjacent such tire bag bead 188. Thereafter, the other bag bead 188 is placed against the inner side of the spacer ring 190 after which an annular clamp ring 195 is positioned to hold the latter bag bead 188 in position. The several parts as best seen in FIG. 14 are located by use of a plurality of circumferentially arranged locating pins 196 extending through spacer ring 190 with the opposite ends thereof disposed in tire bag beads 188, and clamped in place, as best seen in FIG. 15 by a series of circumferentially arranged screws 197 extending through spacer 190 and between clamping ring 195 and the drum cylindrical member 135 and between the locating pins 196. The tire bag beads 188 have tapered ends and engage conformable tapered portions of clamp ring 195 and end drum supporting member 135 with the tapers being in a direction to prevent escaping of the tire bag beads 188 radially outwardly of the clamp ring 195 and the end drum cylindrical member 135.

A plurality of air nipples 200 are connected to the drum supporting member 135 with the latter being ported as at 202 connecting with port means 203 in the spacer ring 190 so that air under pressure may be admitted to the inflatable ply turn-up bag means 138 through the nipples 200.

OPERATION OF THE AFOREDESCRIBED TIRE BUILDING APPARATUS

Initially the several foregoing parts are disposed in the position shown in FIGS. 1a and 1b at which tire carcass material 210 is layed over the sleeve 51 encasing the intermediate drum assembly 4 and end drums 5 and 6. It will be noted that outer end portions 211 and 212 of the tire carcass material overlie the adjacent inner end portions of the inflatable ply turn-up bag means 138. In the position of the parts chamber 100 of control means 79 is charged with air under pressure through hose 98.

With the tire carcass material thus applied, the inner shaft means 26 is initially rotated, as before described, moving the pusher rings 20 toward each other which as previously described disposes the intermediate drum assembly 4 to the position shown in FIGS. 2a and 2b. Simultaneously with the axial inward movement of the pusher rings 20, the end drum and bead shoulder supporting means 63 move axially inwardly toward each other carrying with them the end drum and the tire bead shoulder carrier means 68. Simultaneously with the foregoing upon expansion of the intermediate drum assembly 4 air under pressure is introduced through conduit 131 at the inner end of piston 125, causing the piston 125 to move axially inwardly. The levers 152 hooked over the ring members 149 of the end flanges 147 are moved axially inwardly and through pivot pins 154 effect general radially outward movement of the tire bead flipper means 156 to dispose the leg portions 157 in radially outward horizontal positions, and with the leg portions 158 extending radially inwardly toward the drum to form the tire bead shoulders as shown at 52 in FIGS. 2a and 2b.

As before mentioned, the sleeve 51 is preferably substantially inextensible so that the distance of the sleeve between its opposite clamped ends remains constant. Thus, the tire carcass material mounted on the sleeve 51 will remain of constant length during the forming of the tire bead shoulders 52. Since the length of the sleeve 51 remains substantially constant, the clamped ends of the sleeve 51 must move axially inwardly a distance equal to the length of the sleeve 51 required to form the tire bead shoulders. The end drum carriers 68 are carried axially inwardly in an amount corresponding to the relatively short axial inward movement the pusher rings 20 travel to expand the intermediate drum assembly 4 to the bead set diameter by the axial inward movement of the end drum and shoulder supporting means 63. The additional movement required to move the ends of the sleeve 51 axially inwardly a distance equal to the length required to form the tire bead shoulders 52 is achieved by introducing air under pressure through hose 118 of control means 79 into cylinder 82 at the inner end of piston 80, as at 119, and releasing air under pressure from cylinder 82 at the outer end of piston 80 as at 100 through hose 98 causing the end drum carrier means 68 and first drum carrier member 69 to move toward the center line of the intermediate drum assembly 4. Thus, in turn, the second carrier member 73 moves axially toward the drum center line 25 maintaining the length of the sleeve 51 constant.

In the last described position of the parts the tire beads 53 may be placed by any suitable means, against the tire bead shoulders. As previously noted the tire beads may be prepositioned to be engaged with the tire bead shoulders. Thereafter the inflatable bag ply turn-up means is inflated and moved axially inwardly of the intermediate drum by known pusher means, not shown, to turn up the end portions 211 and 212 of the tire carcass material lying upon the ply turn-up bag means 138 to encase and anchor the beads as shown in FIGS. 2a and 2b. The last described elements for forming a ply turn-up by inflating the inflatable ply turn-up bag means 38 together with pusher means for turning up the ply forms no part of this invention and a typical construction suitable for said purposes is shown and described in U.S. Pat. No. 3,490,980 dated Jan. 20, 1970.

After incorporation of the tire beads in the tire carcass material as above described, the intermediate drum assembly may be further expanded to the position shown in FIG. 3 at which the tread breaker 57 and tread cap 58 and sidewall components 59 may be applied. After completion of formation of the tire, the drum is collapsed as shown in FIG. 5 enabling removal of the completed assembly of the components for a tire by axially sliding the assembled components axially over one end of the apparatus after the mechanism is fully collapsed to the position shown in FIGS 1a and 1b. In collapsing of the drum, air pressure is released from the cylinder 123 to permit the tire bead flipper means 156 to return to the position shown in FIGS. 1a and 1b. The tire bead flipper means 130 are collapsed by the pressure of the tire beads and the plastic memory of the outer inextensible sleeve 51. As the tire building drum reaches its fully collapsed position, air under pressure is introduced into cylinder 82 at the outer end of piston 80, as at 100, which moves the carrier means 68 axially outward thereby tensioning the sleeve 51 to form a taut drum surface for starting the construction of a new tire.

Referring now to FIGS. 6 and 7, the parts are shown in positions in which FIG. 6 provides a minimum spacing apart of the tire beads and in which in the position of parts in FIG. 7 provides for a maximum spacing apart of the tire beads. The foregoing mechanism thus provides for disposal of the tire beads in a predetermined spaced apart relationship with respect to each other. The bead set dimension as will be clear from FIGS. 6 and 7 is achieved by unscrewing the tubular nuts 182 which slackens the sleeve 51. As shown in FIGS. 2a and 2b, adjustment of the nuts 114 causes the second carrier member 73 of the end drum and tire bead shoulder carrying means 68 to move axially outward or inward as desired along the first carrier member 69, to thus dispose the first carrier member 69 and the second carrier member 73 in axially adjusted position for accomplishing positioning of the tire bead shoulder flipper means 156 in the desired axially spaced apart relation in the expanded position of the intermediate drum 4 at which the tire bead shoulders are formed by the tire bead shoulder flipper means 156.

As previously mentioned, the aforedescribed apparatus has particular additional utility in the fabrication of radial tires in which instance the tire carcass material on the drum is reinforced by substantially inextensible cords of wire or other material of high tensile strength extending axially of the cylindrical tire carcass material on the drum.

With tire carcass material of the character last noted on the drum, the tire bead shoulders 52 are formed in the manner described in connection with FIGS. 1a and 1b, and 2a and 2b. Thus, in the position of the parts in FIGS. 2a and 2b, the tire beads 53 are locked or anchored in place. It is highly desirable to maintain the toe to toe or bead to bead dimension constant upon displacement of tire carcass material to a torous configuration. For this purpose with the parts in the position shown in FIGS. 2a and 2b, control means 79 is suitably actuated to admit fluid under pressure into cylinder 82 at the inner end of piston 80, as at 119, and to open to atmosphere cylinder 82 at the outer end of piston 80, as at 100, through hose 98 to assure positioning of the end drum and tire bead shoulders supporting means 63 into engagement with stop members 53 to establish the positioning of the end drum carrier means to position the tire bead shoulders 52 equidistant with respect to the transverse center line of the intermediate drum 4.

In proceeding to initially expand the intermediate drum assembly 4 to shape the tire carcass material, by rotation of inner shaft means 26, the control means 79 is actuated to admit fluid under pressure into cylinder 82 at the outer end of piston 80, as at 100, and to bleed cylinder 82 at the inner end of piston 80, as at 119, causing the end drum carrier means 68 to move axially outwardly relative to axial inward movement of the end drum and tire bead supporting means 63 resulting in tensioning of the tire carcass material from bead to bead while maintaining constant the bead to bead dimension. Since the pistons 80 of the control means 79 are secured to the end drum and tire bead shoulder supporting means 63, which, in turn are secured to pusher rings 20, the end drum and tire bead shoulder supporting means 63 move axially inwardly toward each other and movement of end drum carrier means 68 move relative to the end drum and tire bead shoulder supporting means 63. The admission of fluid under pressure at 100 of control means 79 is regulated to maintain slight tension on the reinforcing cords of the tire carcass material around the intermediate drum assembly in the initial expansion of the intermediate drum assembly 4. Since the tire beads 53 are anchored in the end portions of the substantially axially inextensible tire carcass material the bead to bead dimension remains constant. As the tire carcass material is then further expanded fluid under pressure in cylinder 82 at the outer end of piston 80 maintains the tension on the reinforcing cords of the tire carcass material and particularly the portions thereof which well constitute the side walls of the tire and the bead to bead dimension remains unchanged.

Upon formation of the tire carcass material to the torous shape of FIG. 3, the bead to bead dimension is maintained at the exact dimension established in turning up the opposite end portions of the tire carcass material over the tire beads 53 as shown in FIGS. 2a and 2b.

In that the tire beads 53 are anchored in the end portions of the tire carcass material, and since the tire carcass material is substantially inextensible the encased tire beads upon expansion of the intermediate assembly 4 from the position shown in FIGS. 2a and 2b to that shown in FIG. 3, the anchored tire beads together with the control means 79 as last described maintain the flipper means 161 in their bead forming position to take the reaction of the axial inward movement of the tire beads toward each other to thus maintain tire carcass material under tension in forming the tire carcass material into torous configuration and maintain constant the bead to bead dimension.

As before with the tire carcass material in its final torous configuration, breaker and tread components or other components may be applied to the shaped tire carcass material.

While there has been shown and described a preferred embodiment of the invention, it will be obvious that various modifications and rearrangements may be made therein without departing from the spirit and scope of the invention.

The invention claimed is:

1. In a tire building apparatus having an intermediate expandable drum embodying axially movable drum expanding and contracting means to dispose the intermediate expandable drum in positions defining substantially cylindrical supporting surfaces of different radii, the combination therewith of end drum and tire bead shoulder supporting means movable axially with the axially movable drum expanding and contracting means, end drum carrier means movable axially with and relative to said end drum and tire bead shoulder supporting means, an end drum supported by said end drum carrier means opposite one end of said intermediate expandable drum, tire bead shoulder carrier means movable axially of and relative to said end drum carrier means, and said tire bead shoulder carrier means having tire bead shoulder forming means mounted on said end drum carrier means and adapted to be positioned to form a tire bead shoulder opposite said one end of said intermediate expandable drum in predetermined position of said end drum carrier means and said tire bead shoulder carrier means.

2. The tire building apparatus of claim 1 characterized by said tire bead shoulder forming means comprising flipper means pivotally mounted on said end drum carrier means to be disposed in tire bead shoulder forming and nonforming positions in predetermined positions of said tire bead shoulder carrier means and said drum carrier means.

3. In a tire building apparatus having an intermediate expandable drum embodying axially movable drum expanding and contracting means to dispose the intermediate expandable drum in positions defining substantially cylindrical supporting surfaces of different radii, the combination therewith of end drum and tire bead shoulder supporting means at opposite ends of and movable axially with the axially movable drum expanding and contracting means, end drum carrier means for each of said end drum and tire bead shoulder supporting means each being movable axially with and relative to its associated said end drum and bead shoulder supporting means, end drums supported by said end drum carrier means at opposite ends of the intermediate expandable drum, tire bead shoulder carrier means movable axially of and relative to each of said end drum carrier means, and said tire bead shoulder carrier means each including tire bead shoulder flipper means pivotally mounted on said end drum carrier means and adapted to be positioned to form tire bead shoulders at opposite ends of said intermediate expandable drum in predetermined axial positions of said end drum carrier means and said tire bead shoulder carrier means.

4. The tire building apparatus of claim 3 characterized by said end drum carrier means comprising relatively axially movable first and second carrier members, and drum adjustment means between said first and second carrier members for disposing said second carrier members in a range of predetermined spaced relationships with respect to said opposite ends of said intermediate expandable drum.

5. The tire building apparatus of claim 4 characterized by the provision of tire bead shoulder moving means for each of said tire bead shoulder carrier means for moving the latter axially toward and away from each other.

6. The tire building apparatus of claim 3 characterized by the provision of end drum moving means for moving said end drum carrier means axially toward and away from each other on said end drum and tire bead shoulder supporting means.

7. The tire building apparatus of claim 3 characterized by the provision of an elastic sleeve encasing said intermediate expandable drum and being anchored at its opposite ends in said end drum carrier means.

8. The tire building apparatus of claim 7 characterized by said elastic sleeve being substantially axially inextensible.

9. The tire building apparatus of claim 8 including means for adjusting the position of the anchored end of said elastic sleeve in said end drum carrier means.

10. The tire building apparatus of claim 3 characterized by the provision of end drum carrier moving means, and tire bead shoulder carrier moving means, and means for energizing said end drum carrier moving means and said tire bead shoulder moving means for simultaneously moving said end drum carrier means and said tire bead shoulder carrier means axially toward said intermediate expandable drum.

11. The tire building apparatus of claim 3 characterized by the provision of inflatable bag means carried by said end drum carrier means.

12. In a tire building apparatus having an expandable intermediate drum the combination therewith of end drum means disposed axially outwardly of one end of said intermediate drum means, said end drum means comprising an end drum supporting member, inflatable ply turn-up bag means supported on said end drum supporting member, said inflatable ply turn-up bag means having opposed tire bag beads, one of said tire bag beads being disposed over the axial inner end of said end drum supporting member, spacer means having one side thereof adjacent to and in engagement with said one tire bag bead, the other of said tire bag beads being adjacent to and in engagement with the other side of said spacer means, clamping ring means for securing said tire bag beads in position, the adjacent surfaces of said tire bag beads and said clamping ring in the inner end of said end drum supporting member being tapered in a direction for preventing radial outward movement of said tire bag beads, said end drum supporting member and said spacer means being ported for admitting air under pressure into said inflatable ply turn-up bag means and, a plurality of circumferentially arranged locating means extending through said spacer means and having their opposite ends mounted in said tire bag beads for locating the tire bag beads around said spacer means.

13. The tire building apparatus of claim 12 characterized by a plurality of circumferentially arranged securing screws extending through said spacer means and between said clamping ring means and the inner end of said drum supporting member.

14. In a tire building apparatus having an intermediate expandable drum, end drums at opposite ends of said intermediate expandable drum, said intermediate expandable drum embodying axially movable drum expanding and contracting means to dispose the intermediate expandable drum in a first position defining together with said end drum a substantially cylindrical supporting suface for supporting tire carcass material thereon of cylindrical configuration and having reinforcing cords extending axially thereof, said intermediate expandable drum being adapted to be disposed in a second position to provide a second cylindrical surface at which tire bead shoulders are formed in the tire carcass material inwardly of opposite end portions of the tire carcass material, and thereafter to define a third cylindrical surface disposing an intermediate portion of said tire carcass material at a diameter substantially that of a completed tire, the combination therewith of end drum and tire bead shoulder supporting means at opposite ends of and movable axially with the axially movable drum expanding and contracting means of said intermediate expandable drum, end drum carrier means for each of said drum and tire bead shoulder supporting means each being movable axially with and relative to its associated said end drum and bead shoulder supporting means, tire bead shoulder carrier means movable axially of and relative to each of said end drum carrier means, said tire bead shoulder carrier means each having tire bead shoulder forming means mounted on said end drum carrier means and adapted to be positioned to form tire bead shoulders in the tire carcass material outwardly of the opposite ends of said intermediate expandable drum and inwardly of the opposite ends of the tire carcass material at said second position of said intermediate expandable drum and in predetermined axial positions of said end drum carrier means and said tire bead shoulder carrier means and at which tire beads are encased in the end portions of said tire carcass material, and control means between said end drum and tire bead shoulder supporting means and said end drum carrier means operable so that the encased tire beads maintain the reinforcing cords of the tire carcass material under tension from bead to bead in displacement of said tire carcass material to substantially torous configuration and to maintain constant the bead to bead dimension established at the displacement of the tire carcass material forming the tire bead shoulders in forming the tire carcass material from the second position to the third position of said intermediate expandable drum in forming the tire carcass material into substantially torous configuration approximating that of a completed tire.

15. The tire building apparatus of claim 14 characterized by said control means comprising cylinders formed between said end drum and tire bead shoulder supporting means and said end drum carrier means, pistons mounted for reciprocation in said cylinders connected to said end drum and tire bead supporting means, means for disposing said piston means in predetermined axially outwardly away relation from each other in movement of said intermediate expandable drum to its second position to dispose the tire bead shoulders formed on the tire carcass material equi-distant from the center line of said intermediate expandable drum.

16. The tire building apparatus of claim 15 including means for applying pressure to said piston means for effecting axial inward movement of said end drum carrier means and relative to axial inward movement of said end drum and tire bead shoulder means in movement of said intermediate expandable drum from its second position to its third position.

17. The tire building apparatus of claim 16 including means for applying pressure to said piston means of said control means upon movement of said end drum and tire bead supporting means and said end drum carrier means axially toward each other so as to maintain said tire bead shoulder forming means in their tire bead shoulder forming positions.

18. In a tire building apparatus having an intermediate expandable drum and end drums at opposite ends of said intermediate drum for supporting thereon tire carcass material having axially extending reinforcing cords therein, said intermediate expandable drum embodying axially movable drum expanding and contracting means, said intermediate expandable drum having one predetermined position at which tire bead shoulders are adapted to be formed into tire carcass material inwardly at opposite end portions of said tire carcass material, and thereafter to another predetermined position to define a cylindrical surface disposing the intermediate portion of said tire carcass material at a diameter substantially that of a completed tire, the combination therewith of end drum and tire bead shoulder supporting means at opposite ends of and movable axially with the axially movable drum expanding and contracting means of said intermediate expandable drum, end drum carrier means for each of said drum and tire bead shoulder supporting means each being movable axially with and relative to its associated said end drum and tire bead shoulder supporting means, tire bead shoulder carrier means movable axially of and relative to each of said end drum carrier means, said tire bead shoulder carrier means each having tire bead shoulder forming means mounted on said end drum carrier means and adapted to be positioned to form tire bead shoulders in the tire carcass material outwardly of opposite ends of said intermediate expandable drum in said one predetermined position thereof and inwardly of the opposite end portions of the tire carcass material in predetermined axial positions of said end drum carrier means and said tire bead shoulder carrier means, and at which position tire beads are encased in the end portions of said tire carcass material, and control means between said end drum and tire bead shoulder supporting means and said end drum carrier means operable so that the encased tire beads maintain the reinforcing cords of the tire carcass material under tension from bead to bead in displacement of said tire carcass material to substantially torous configuration and to maintain constant the bead to bead dimension established at the displacement of the tire carcass material forming the tire bead shoulders in the tire carcass material with the tire beads encased in the opposite end portions of the tire carcass material to the position of said intermediate expandable drum forming the tire carcass material into substantially torous configuration approximating that of a completed tire.

19. In a tire building apparatus having an intermediate expandable drum embodying axially movable drum expanding and contracting means to dispose the intermediate expandable drum in position defining substantially cylindrical supporting surfaces of different radii, the combination therewith of end drum and tire bead shoulder supporting means movable axially with the axially movable drum expanding and contracting means, end drum carrier means movable axially with and relative to said end drum and tire bead shoulder supporting means, an end drum supported by said end drum carrier means opposite one end of said intermediate expandable drum, tire bead shoulder carrier means movable axially with said end drum carrier means, and said tire bead shoulder carrier means having tire bead shoulder forming means mounted on said end drum carrier means and adapted to be positioned to form a tire bead shoulder opposite said one end of said intermediate expandable drum in predetermined position of said end drum carrier means and said tire bead shoulder carrier means.

References Cited

UNITED STATES PATENTS 3,171,769   3/1965   Henley et al. _ _ _ _ _ _ 156—401 X

STEPHEN C. BENTLEY, Primary Examiner

U.S. Cl. X.R.

156—415, 417